P. C. HAAN.
NUT LOCK.
APPLICATION FILED NOV. 27, 1907.

898,464.

Patented Sept. 15, 1908.

Witnesses

Paul C. Haan, Inventor
By his Attorney

UNITED STATES PATENT OFFICE.

PAUL C. HAAN, OF MIDLAND PARK, NEW JERSEY, ASSIGNOR TO HIMSELF, AND HORACE G. STRIPE, OF NEW YORK, N. Y.

NUT-LOCK.

No. 898,464.      Specification of Letters Patent.      Patented Sept. 15, 1908.

Application filed November 27, 1907. Serial No. 404,007.

*To all whom it may concern:*

Be it known that I, PAUL C. HAAN, a citizen of the United States of America, and a resident of Midland Park, Bergen county, New Jersey, have invented certain new and useful Improvements in Nut-Locks, of which the following is a specification.

My invention relates to nut locks or means for preventing the rotation of a nut, when the same is once screwed home on a bolt; and the object of the invention is to provide a washer, to act as a nut lock, of novel and useful design and of small cost in the manufacture.

The detailed construction of my invention is set forth in the following specification and illustrated in the accompanying drawing, in which latter I have shown my device in use on bolts for bolting together fish plates and rails, although my invention is adaptable for use in any place where it is desired to employ a nut lock.

Figure 1:
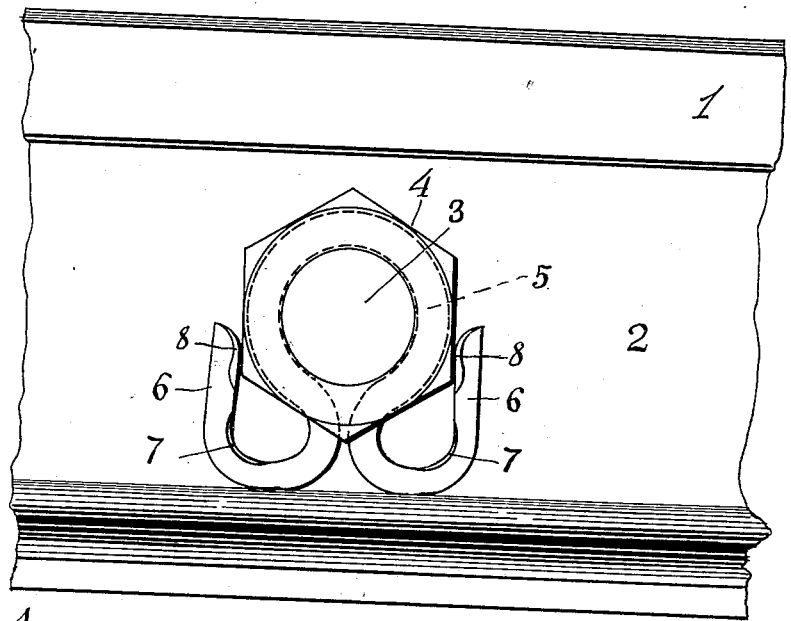
Figure 2:
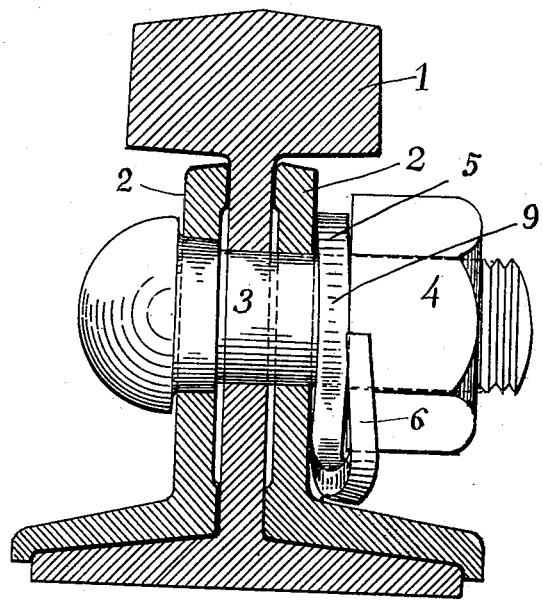

Figure 1 is an elevation of a rail and fishplate held together by a nut lock embodying my invention and Fig. 2 is a cross sectional view of the parts shown in Fig. 1.

In the said drawing the reference numeral 1 denotes a rail of the usual form, which is connected to a second rail, not shown, by means of the fish plates 2, 2. No detailed description of these parts are necessary as they form no part of this invention.

The fish plates and rail are securely tied together by means of the bolt 3 and nut 4 and between the fish plate and the nut I place the locking member as clearly seen in Fig. 2. The locking member is formed preferably of steel and comprises the washer portion 5 adapted to closely fit around the stem of the bolt and acts as a washer, and the prongs or locking portions 6, 6 which are bent as shown and by means of which the nut is held securely against rotation after being screwed tight against the washer portion.

It will be observed that the locking member is made in one piece and that the prongs are made flexible with relation to the washer body, by reason of the cut away portions 7, 7, and the said prongs are bent outward in a plane different from the plane of the washer body, so as to get a grip on the nut. The prongs after being bent outward as described extend in a right line practically parallel to the face of the washer portion and will therefore lie flat against the sides of a nut placed on a bolt passing through the washer portion. In order to facilitate the tightening of the nut and to permit the prongs to "slip" while the nut is being screwed on, I provide the beveled portions 8, 8, and to further increase the grip of the nut, the washer body is bent slightly outward as indicated at 9. Thus the washer portion of the nut is given a concavo-convex form, and when a nut is forced against it the resiliency of the metal will serve to prevent movement of the nut. It will be understood that as the nut is screwed on the bolt it engages the prongs, which by reason of the cut away portions 7, 7 act as springs and permit the nut to be screwed home, while the bevels 8, 8 facilitate the passing of the nut between the prongs. When once the nut is properly tightened, the prongs grip the same firmly as shown in Fig. 1 and prevent the same from becoming loose, while the bent portion at 9 provides tension for the same purpose.

The above is thought to fully illustrate and disclose my invention and the use of the same and I claim all such changes thereof as come within the legitimate intent and scope of the claims.

What I claim is:

A nut lock consisting of a loop-shaped washer portion concavo-convex in general contour and having an opening for the reception of a bolt, the ends of the loop extending outward from one face of the washer portion and then in substantially a right line parallel to the face of the washer, the inner faces of the ends being beveled, whereby a nut placed on a bolt passing through the washer portion will be secured in place by the resiliency of the washer portion and will be confined and held at opposite sides by the ends, substantially as described.

Signed at New York, N. Y., this 19 day of November 1907.

PAUL C. HAAN.

Witnesses:
    IVAN KONIGSBERG,
    JOS. K. ELLENBOGEN.